United States Patent Office 3,538,683
Patented Nov. 10, 1970

3,538,683
METHOD OF GAS-SOLID CHROMATOGRAPHY
Zdzislaw Krawiec, Ul. PCK 6/4, Tarnow, Poland
Filed May 6, 1968, Ser. No. 726,672
Claims priority, application Poland, May 10, 1967,
P 120,476
Int. Cl. B01d *15/08*
U.S. Cl. 55—67
6 Claims

ABSTRACT OF THE DISCLOSURE

Polyamide granules or grains of highly developed adsorbent surface including imido and carbonyl groups are used as an adsorbent in carrying out a gas-solid chromatography.

---

Figure 3:
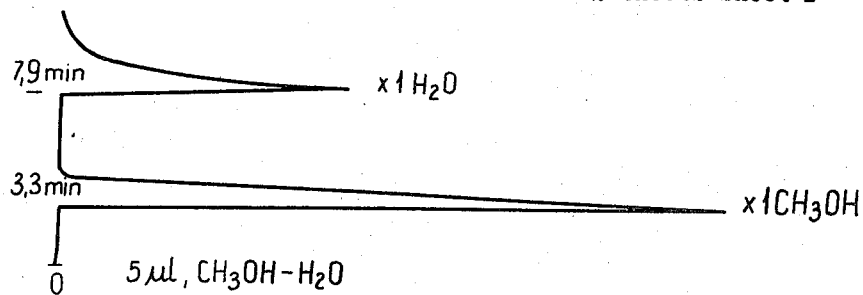

An object of the invention is to provide a method for carrying out gas-solid chromatography using new adsorbents. Very advantageous effects in gas-solid chromatography can be achieved using the new adsorbents according to the present invention, as compared with effects obtained with adsorbents which have been used in gas-solid chromatography heretofore, such as: silica gel, activated carbon, aluminum oxide, molecular sieves, graphitized carbon black and Porapak.

Adsorbents which have been used heretofore in gas-solid chromatography are most suitable in analysing low-boiling gases. With graphitized carbon black good resolution of some liquid and solid substances can be obtained. "Porapak," known since 1956, is a valuable gas chromatography adsorbent and has rendered possible many resolutions of organic and inorganic substances.

It is known from the theory of chromatography that the application of adsorbents in gas chromatography will provide a possibility of obtaining new valuable effects which cannot be achieved with the technique of gas-liquid partition chromatography. Although gas chromatography belongs to the chromatography family, it involves special requirements, regarding solid adsorbents used in the GSC technique and liquid phases used in the GLC technique, because the operation factors of a column in the case of gas chromatography differ considerably from those of columnar thin layer chromatography.

Chromatography was initiated by the works of Tswett in 1903, while gas chromatography was originated only in about 1952. Application of polyamides as adsorbents in columnar chromatography, thin-layer chromatography and in purification of solutions containing organic substances has been widely known.

However, application of the polyamide adsorbent has not been hereto known in gas chromatography.

The new polyamide adsorbents for gas chromatography serve the purpose of separating organic and inorganic matters capable of forming hydrogen bond.

The method according to the invention comprises application of suitably prepared polyamides, in the form of granules or grains of highly developed surface and particle-size distribution meeting the requirements of gas chromatography, as a packing for gas-solid chromatographic tubes. Any known polyamide may be used as a starting material for the manufacture of polyamide adsorbents. However, those of a high melting point are particularly suitable.

Tests performed on adsorbents prepared from the most readily available commercial polyamides, such as polyamides of grades 6; 66; 610; 11; 12, and the less readily available ones such as: 4; 7; 1010; polyethylene-terephthalamide and others, have shown that the resistance of the polyamide adsorbents to thermochemical conditions under which the gas-solid chromatography process is carried out, increases with increasing length of the hydrocarbon radical chain located between two adjacent peptide linkages. With the increasing length of the chain retention times of all the substances capable of forming a hydrogen bond/i.e., donor-acceptor bond/decrease. Also the fact of increasing hydrophobic properties in the same direction, i.e., with increasing distance between the adjacent peptide linkages, is recognized. In the surface of the polyamide adsorbents, there are imido groups and carbonyl groups which have the ability of being electron donors and acceptors. It may be expected that this ability is enhanced by the fact of existence of certain bonds, probably of the hydrogen type, between imido and carbonyl groups of the particular macromolecules constituting the adsorbent grain.

For this reason the imido and carbonyl groups in the adsorbent surface are of particular activity, and thereby provide the sorptive properties of the adsorbent which are desired are ensured. An important advantage of the adsorbents manufactured according to the inventions is low vapour pressure at operation temperature enabling the adsorbent to be used in temperature-programmed chromatographical apparatus equipped with high-sensitive detectors. The adsorbent may be used over a wide temperature range, from very low temperatures, since its application is not restricted by a lowest temperature limit as the case may be in the liquid phase of G-L chromatography, up to high temperatures which are lower by 120 to 130° from the melting point of the polyamide from which the given adsorbent is manufactured. No change in retention volume of the substances investigated, even after a prolonged time, was observed.

An advantage of this invention is the possibility of regeneration of the adsorbent in the case of a loss in its normal activity. This feature is particularly advantageous as regards application of these adsorbents in gas chromatography.

Another very valuable advantage of the adsorbent manufactured according to the invention is the possibility of carrying out various modifications, ranging from additions of thermal and chemical stabilizers, to chemical modifications, e.g., partial alkylation of the surface imido groups, partial oxidation of the adsorbent surface and finally, applying small quantities of liquid phases thereon.

Some methods of manufacturing the adsorbents and some of their analytical properties as regards their application in gas-solid chromatography are given below.

EXAMPLE 1

"Polyamide 6" (6 g.) having molecular weight ranging from $2 \cdot 10^4$ to $3 \cdot 10^4$ was dissolved in formic acid (100 g.) and cupric stearate or cupric lysinate in an adequate quantity such that its content was about $5.10^{-2}\%$ and after dissolution was completed the solution formed was treated with 3% aqueous sodium hydroxide until the adsorbent precipitated. A homogenizer remained switched on from the beginning of the dissolution to the precipitation, in order to accelerate the dissolution in the first stage and to facilitate gradual transition of a solution from lyophilic to lyophobic properties in the second stage.

If the solution were not given a homogenization treatment adsorbent grains of various size, or in the form of fibrous-spongy mass would be obtained.

The precipitated adsorbent grain was filtered and rinsed with water until acid reaction ceased, and then rinsed with 5% aqueous ammonia until the alkaline reaction ceased. The rinsed adsorbent had a high content of moisture and therefore it was pre-dried in an air stream.

After the pre-drying, the adsorbent grain was screen classified when necessary. The screen classified adsorbent was then activated in a vacuum drier in a temperature ranging from 90° to 100° C. under a pressure of the order of $10^{-1}$ kg./cm.$^2$ until constant mass was obtained. The adsorbent prepared in the above manner was used as the packing for columns by means of which the resolutions shown in the accompanying figures were obtained.

Figure 1:
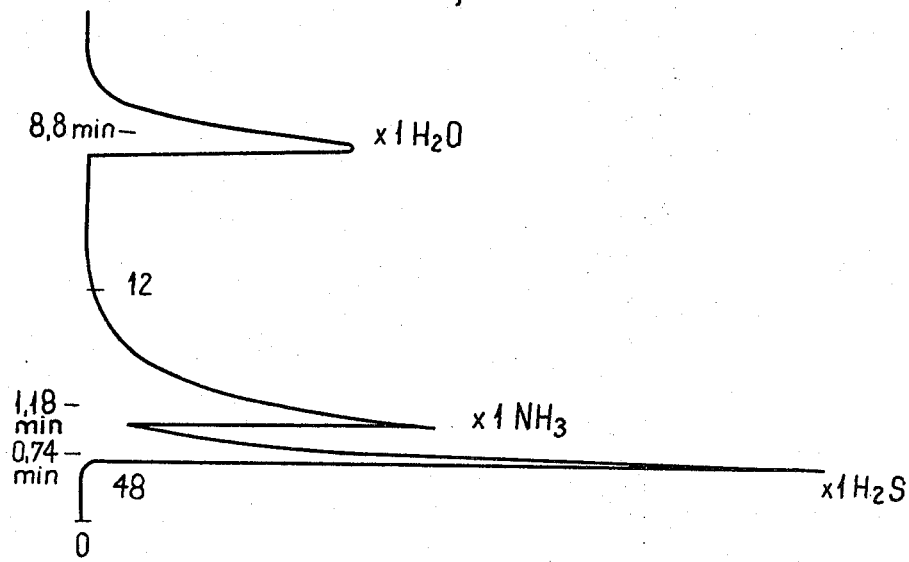

FIG. 1 shows a chromatogram of resolution of thermal decomposition products of a $(NH_4)_2S$ solution, using the adsorbent prepared according to Example 1.

The analysis was performed with a gas chromatograph Griffin George type MK–II–B fitted with a thermal conductivity detector, using a 360 cm.×0.6 cm. column packed with polyamide adsorbent of particle size distribution from 0.2 to 0.3 mm.

Figure 2:
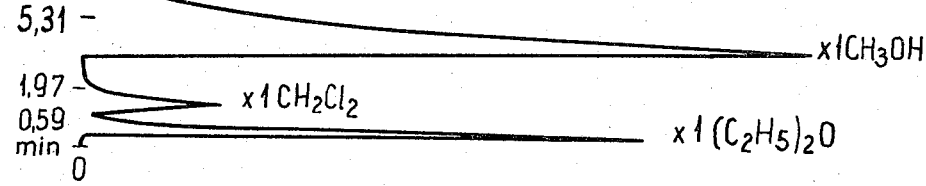

Column temperature: 96° C.; carrier gas ($H_2$) flow: 3.6 litres per hour; bridge current: 100 ma.; sample volume: 5l FIG. 2 shows a chromatogram of resolution of a solution containing $(C_2H_5)_2O$; $CH_3OH$ and $CH_2Cl_2$, under conditions similar to those specified above, provided that the column temperature was 69° C. and column dimensions 180 cm.×0.6 cm.

FIG. 3 shows a chromatogram of quantitative analyses of water-methanol solutions.

Figure 5:
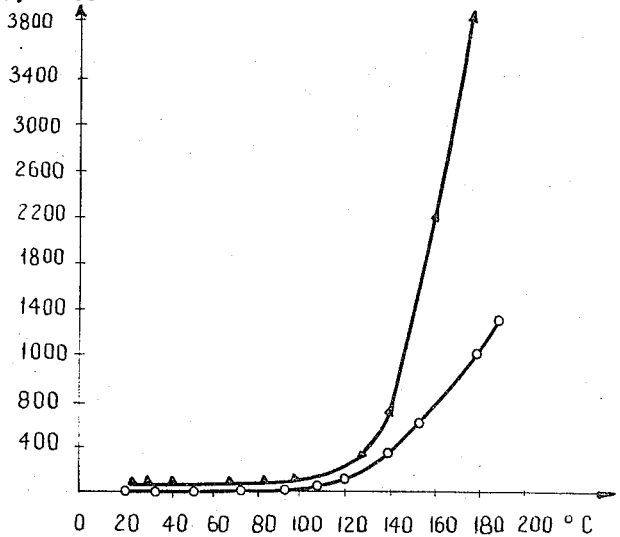
Figure 4:
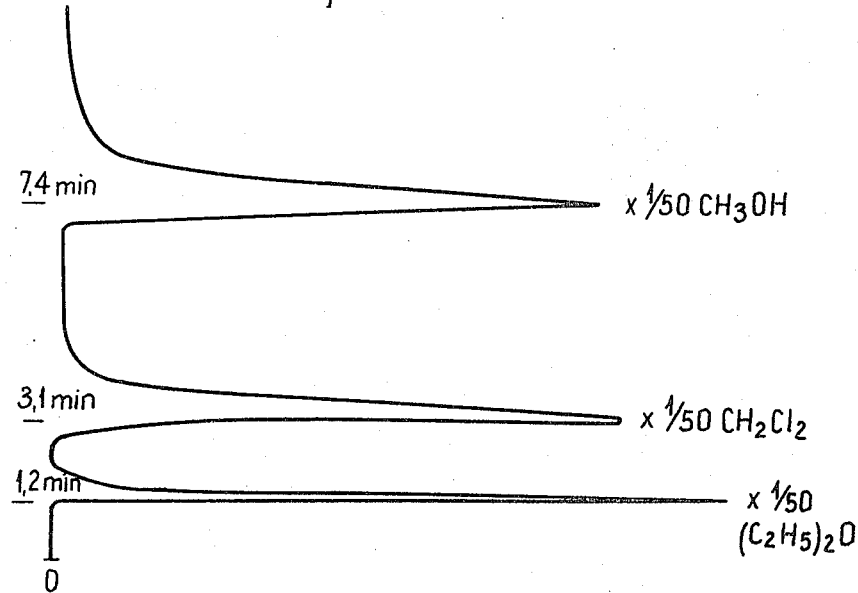

FIG. 4 shows a chromatogram of resolution of the mixture defined in the description of FIG. 2, taken by means of a flame ionization detector of gas chromatograph type Chrom II. Column: 180 cm.×0.6 cm. Packing: polyamide adsorbent of particle size distribution from 0.2 to 0.3 mm.; nitrogen (carrier gas) flow: 1.4 litre per hour; hydrogen flow: 55 millilitres per minute; air flow: 600 millilitres per minute. FIG. 5 shows a comparison of zero currents of the flame ionization detector in relation to temperature of a column. The measurements were performed on a gas chromatograph type Chrom II using columns packed with a heat resistant phase of Silicone fluid DC 550 in the quantity of 15% on celite 545 (curve 1), the adsorbent prepared from polyamide 6 (curve 2).

The manner of preparation of the adsorbent as described above renders the latter free of volatile components e.g. oligomers, caprolactam etc. which results in general reduction in vapour pressures over the adsorbent, which pressure, as can be seen from FIG. 5, is relatively low as compared with that of heat resistant silicone oils.

EXAMPLE 2

"Polyamide 66" (50 g.) having molecular weight of the order of 4·10$^4$ was dissolved in concentrated hydrochloric acid (450 ml.). In order to accelerate the dissolution process the solution was agitated with a glass stirrer and particulate glass "Pyrex," "Jena" or "Silvit" (25 g.) of particle size about 0.10 mm. introduced thereto and 5·10$^{-2}$% of cupric stearate and 10% aqueous solution of methanol or acetone (750 ml.) added.

Upon the addition of the latter solution polyamide adsorbent was precipitated. The precipitated adsorbent was rinsed with water and treated with aqueous ammonia, so as to exactly neutralize the acid left within the mass of the adsorbent, rinsed with water and subsequently treated as described in Example 1.

Resolutions obtained with the adsorbent prepared in the above manner were simliar to those described above, provided that retention times were shorter by about 10%.

EXAMPLE 3

"Polyamide 610" (50 g.) having molecular weight of about 5·10$^4$ was added to molten phenol (500 g.). After dissolution of the polyamide took place, what could be accelerated by homogenization, particulate glass (25 g.) of particle size about 0.10 mm., and 5·10$^{-2}$% of cupric stearate or lysinate were added.

The phenolic solution of the polyamide was treated with 10% aqueous solution of sodium hydroxide at a temperature about 60° C. until a thick oily substance was formed.

The formed substance was separated from the remaining aqueous phenol solution and after switching on the homogenizer ethanol was added.

Phenol contained in the polyamide pulp was extracted with ethanol and as a result of the extraction the absorbent of particle size distribution 0.1 to 0.8 mm. was obtained. After pre-drying and classification screening the adsorbent was further processed in the manner described in Example 1.

Resolutions obtained with this adsorbent were similar to those described in Examples 1 and 2, provided that retention times were still shorter.

EXAMPLE 4

"Polyamide 11" (50 g.) having molecular weight of about 4·10$^4$, was dissolved in molten phenol (500 g.).

All the subsequent operations were carried out in a manner similar to that described in Example 3.

Resolutions obtained with this adsorbent were characterized by still shorter retention times. Such a behaviour of the adsorbents conforms to the decreasing number of active peptide linkages on the adsorbent surface layer.

The examples of mixture separation referred to, illustrated with FIGS. 1 to 4, confirm the high suitability of the polyamide adsorbents for gas-solid chromatography.

What we claim is:

1. In a method of separating materials by forming a hydrogen bond by gas-solid chromatography the improvement which comprises using as an adsorbent material a column of packing of polyamide grains of highly developed surface including imido and carbonyl groups and having a particle size distribution of about 0.2 to 0.3 mm.

2. The method according to claim 1 wherein said adsorbent polyamide material is prepared by activation at an elevated temperature and under reduced pressure.

3. The method according to claim 1 wherein said adsorbent polyamide material is stabilized to render it resistant to prolonged action of high temperatures with addition of a substance selected from the group consisting of copper salts of higher fatty acids, aromatic amines and copper lysinate.

4. The method according to claim 1 wherein the surface of said adsorbent polyamide material is modified by partial methylation of the imino groups present.

5. The method according to claim 1 wherein the surface of said adsorbent polyamide material is modified by partial oxidation of said surface.

6. The method according to claim 1 wherein the surface of said adsorbent polyamide material is modified by applying to said surface small quantities of liquid phases.

References Cited

UNITED STATES PATENTS 3,376,694   4/1968   Owens et al. _____ 55—67

JAMES L. DeCESARE, Primary Examiner